(12) United States Patent
Beldycki

(10) Patent No.: US 6,510,271 B1
(45) Date of Patent: Jan. 21, 2003

(54) OPTICAL FIBER MOUNTING AND CLEAVING DEVICE AND METHOD

(75) Inventor: Wojciech Beldycki, Venice, FL (US)

(73) Assignee: Valdor Fiber Optics, Inc., Reno, NV (US)

( * ) Notice: Subject to any disclaimer, the term of this patent is extended or adjusted under 35 U.S.C. 154(b) by 0 days.

(21) Appl. No.: 09/479,719

(22) Filed: Jan. 7, 2000

Related U.S. Application Data (60) Provisional application No. 60/115,158, filed on Jan. 8, 1999.

(51) Int. Cl.[7] .............................. G02B 6/00; G02B 6/36
(52) U.S. Cl. .......................... 385/134; 385/85; 385/147
(58) Field of Search ................................ 385/134, 147, 385/85

(56) References Cited

U.S. PATENT DOCUMENTS

| | | | |
|---|---|---|---|
| 4,036,419 A | * | 7/1977 | Hensel et al. .............. 225/96.5 |
| 4,084,308 A | * | 4/1978 | Runge |
| 4,182,017 A | * | 1/1980 | Ford et al. |
| 4,229,876 A | * | 10/1980 | Doty |
| 4,621,754 A | * | 11/1986 | Long et al. .................... 225/96 |
| 4,976,390 A | * | 12/1990 | Gee et al. ..................... 225/96 |
| 5,305,406 A | * | 4/1994 | Rondeau ....................... 385/81 |
| 5,351,333 A | * | 9/1994 | Chambers ................... 385/134 |

FOREIGN PATENT DOCUMENTS

GB       2046242 A   *  11/1980

* cited by examiner

Primary Examiner—Rodney Bovernick
Assistant Examiner—Michael J. Stahl
(74) Attorney, Agent, or Firm—Robert O. Guillot; Intellectual Property Law Offices (57) ABSTRACT

The present invention incorporates an optical fiber cleaving mechanism within a prior art optical fiber impact mounting device. The optical fiber cleaving mechanism is pivotally mounted within the fiberoptic connector holding mechanism, such that an optical fiber cleaving blade is disposed proximate the tip of the fiberoptic connector. After the optical fiber has been engaged within the fiberoptic connector an end of the optical fiber protrudes from the tip of the fiberoptic connector. An actuator member is then manipulated to cause the optical fiber cleaving mechanism to rotate downwardly, such that the cleaving blade will make cleaving contact with the surface of the optical fiber. Immediately prior to the contact of the cleaving blade with the optical fiber, a portion of the cleaving mechanism makes contact with the protruding end of the optical fiber to bend it downwardly, and the subsequent contact of the cleaving blade will cleave the optical fiber. In the preferred embodiment, the cleaving blade is movably mounted, such that it makes a scoring contact with the optical fiber to aid in the cleaving process. After the cleaving step, the optical fiber is mounted within the fiberoptic connector and its protruding end has been cleaved, whereupon it is removed from the apparatus for subsequent polishing.

24 Claims, 4 Drawing Sheets

OPTICAL FIBER MOUNTING AND CLEAVING DEVICE AND METHOD

GROSS REFERENCE TO RELATED APPLICATION

This application claims priority to U.S. Provisional Patent Application Serial No. 60/115,158, entitled Optical Fiber Mounting and Cleaving Device and Method, filed Jan. 8, 1999.

BACKGROUND OF THE INVENTION

1. Field of the Invention

The present invention relates generally to devices and method for installing fiberoptic connectors upon optical fibers, and more particularly to devices and methods for mounting optical fibers within fiberoptic connectors and thereafter cleaving the end of the optical fiber.

2. Description of the Prior Art

Devices and methods for mounting fiberoptic connectors upon optical fibers are well known. Such devices and methods include the use of epoxies and other chemical agents to bond the optical fiber within a fiberoptic connector, as well as dry methods including the impact mounting of an optical fiber within a fiberoptic connector as is taught in U.S. Pat. No. 5,305,406, entitled Fiberoptic Connector Assembly and Method and Device for the Manufacture Thereof, issued Apr. 19, 1994. In all such prior art optical fiber mounting devices and methods, a subsequent step of cleaving the protruding end of the optical fiber must be undertaken. The optical fiber is cleaved proximate the tip of the fiberoptic connector to which it has been installed, and thereafter the end of the optical fiber is polished to a smooth surface at the tip of the fiberoptic connector.

In the prior art, separate optical fiber cleaving devices are utilized to cleave the protruding end of the optical fiber after it has been mounted within the fiberoptic connector. The cleaving process therefore requires additional fabrication time in that the mounted optical fiber must be separately installed or held in a cleaving device, whereupon the optical fiber cleaving step is then accomplished.

The present invention is an improvement upon the prior art optical fiber mounting and cleaving process steps in that the optical fiber is first mounted within a fiberoptic connector and then cleaved proximate the tip of the fiberoptic connector without removing the optical fiber and fiberoptic connector from the mounting device. That is, the optical fiber is both mounted and then cleaved in two steps that are performed within single fabricating apparatus. The present invention therefore saves time and manufacturing expense, and is generally more efficient than the prior art fabrication process.

SUMMARY OF THE INVENTION

The present invention incorporates an optical fiber cleaving mechanism within a prior art optical fiber impact mounting device. The optical fiber cleaving mechanism is pivotally mounted within the fiberoptic connector holding mechanism, such that an optical fiber cleaving blade is disposed proximate the tip of the fiberoptic connector. After the optical fiber has been engaged within the fiberoptic connector an end of the optical fiber protrudes from the tip of the fiberoptic connector. An actuator member is then manipulated to cause the optical fiber cleaving mechanism to rotate downwardly, such that the cleaving blade will make cleaving contact with the surface of the optical fiber. Immediately prior to the contact of the cleaving blade with the optical fiber, a portion of the cleaving mechanism makes contact with the protruding end of the optical fiber to bend it downwardly, and the subsequent contact of the cleaving blade will cleave the optical fiber. In the preferred embodiment, the cleaving blade is movably mounted, such that it makes a scoring contact with the optical fiber to aid in the cleaving process. After the cleaving step, the optical fiber is mounted within the fiberoptic connector and its protruding end has been cleaved, whereupon it is removed from the apparatus for subsequent polishing.

It is an advantage of the present invention that optical fibers can be more rapidly and efficiently mounted to fiberoptic connectors.

It is another advantage of the present invention that optical fibers can be mounted to a fiberoptic connector and the protruding end of the optical fiber can be subsequently cleaved within a single fabricating apparatus.

It is a further advantage of the present invention that a fabrication apparatus has been developed which facilitates the mounting of an optical fiber to a fiberoptic connector, followed by the cleaving of the end of the optical fiber without removing the optical fiber and connector from the apparatus.

These and other features and advantages of the present invention will no doubt be understood by those skilled in the art upon reading the following detailed description which makes reference to the several figures of the drawings.

DETAILED DESCRIPTION OF THE PREFERRED EMBODIMENTS

Figure 1:
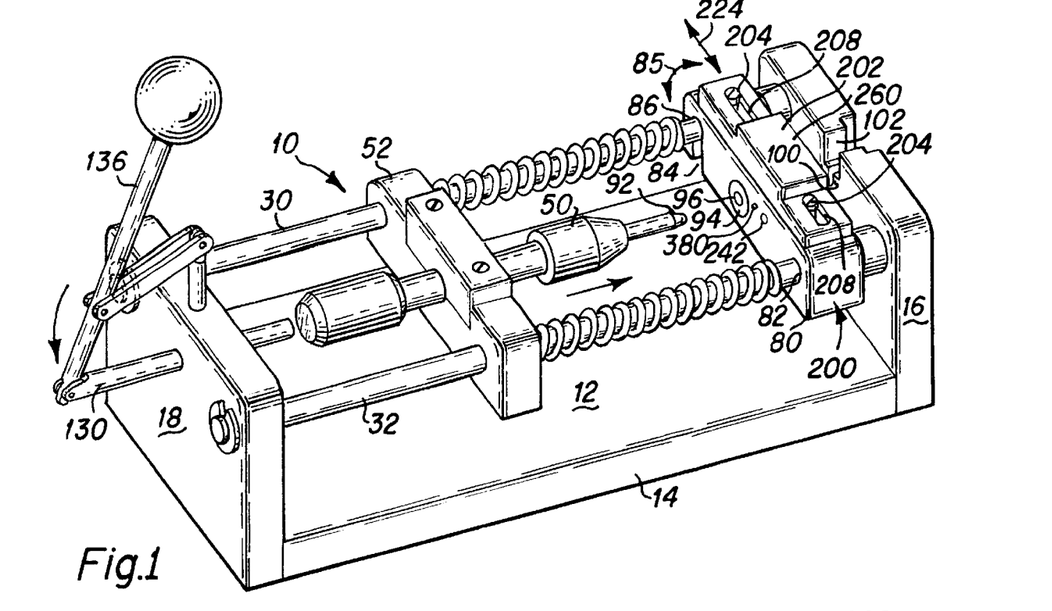
FIG. 1 is a perspective view of a fiberoptic connector impact mounting device of the present invention including an optical fiber cleaving device of the present invention.

A fiberoptic connector assembly device 10 of the present invention is depicted in FIG. 1. A detailed description of significant components and operational aspects of the device 10 is taught in U.S. patent application Ser. No. 5,305,406, issued Apr. 19, 1994, entitled "Fiberoptic Connector Assembly and Method and Device for the Manufacture Thereof," the content of which patent is incorporated herein at this point as though set forth in full.

Generally, the device 10 includes a frame 12 including a base 14, a first sidewall 16, a second sidewall 18, two parallel rails 30, 32 disposed between the sidewalls 16 and 18, a spring loaded punch (or impact driver 50) mounted within a slidable punch holding member 52, a punch activating device including a push rod 130 that is operated by a lever arm 136, and a fiberoptic connector alignment holder 80 that is pivotally engaged 85 between the rails 30 and 32. The end member 16 includes a narrow fiberoptic connector holding slot 100 having a widened upper shoulder portion 102 for retaining the fiberoptic connector during the impact mounting process. A bore 82 is formed through the holder 80, such that rail 32 projects through the bore 82, and the holder 80 is thereby slidably and pivotally engaged with the rail 32. A slot 84 is formed through the holder 80 proximate the intersection of holder 80 with rail 30, such that the inner end 86 of the slot 84 slidably engages the rail 30. An impact tool bushing 94 having an impact tool bore 96 formed therein is engaged within the holder 80, such that the bore 96 is axially aligned with the impact nose 92 of the punch 50.

A significant additional feature of the present invention over the fiberoptic connector assembly device disclosed in the '406 patent is the addition of an optical fiber cleaving mechanism 200 that is disposed within the holder 80. To operate the cleaving mechanism 200 a cleaver slide 202 is slidably mounted on top of the holder 80 utilizing two mounting screws 204 which reside within an oblong, slotted recesses 208 formed through the slide 202. Generally, and as is discussed in detail hereinafter, after an optical fiber is impact mounted within a fiberoptic connector utilizing the punch 50, an optical fiber cleaving device disposed within the holder 80 is then utilized to cleave the optical fiber at the tip of the connector without moving the connector from its position within the holder 80.

Figure 2:
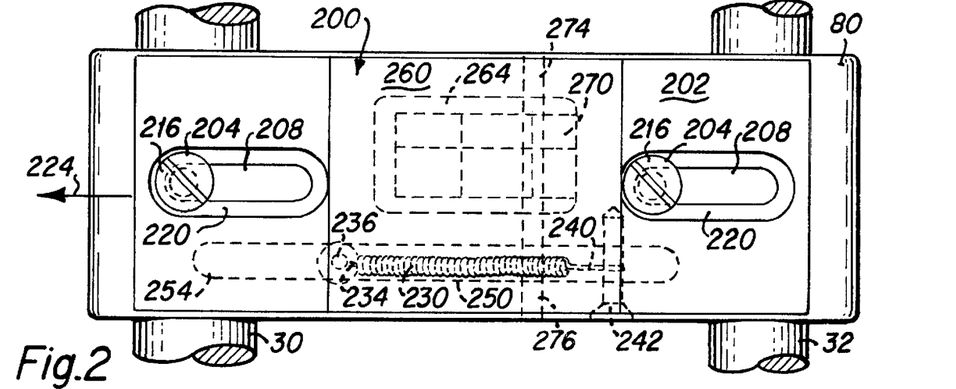
FIG. 2 is a top plan view of the optical fiber cleaving device portion of the present invention.
Figure 3:
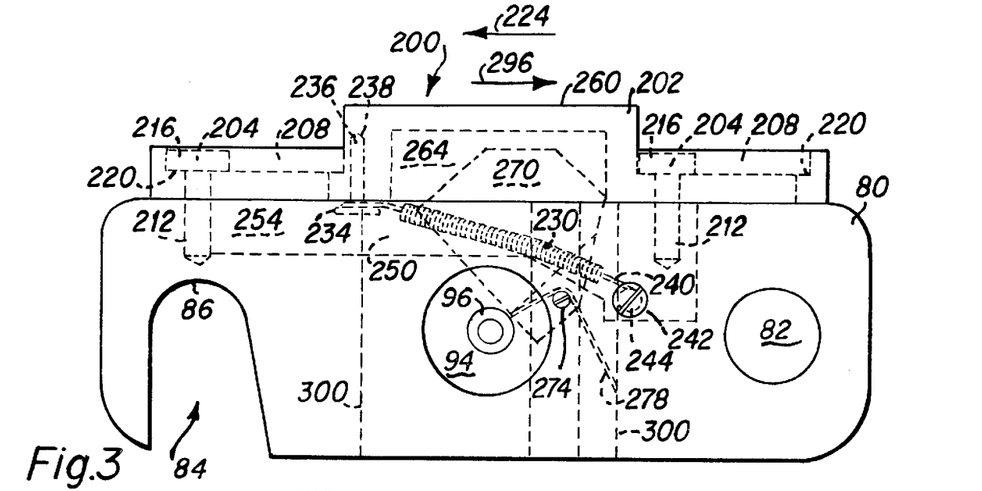
FIG. 3 is a front elevational view of the optical fiber cleaving device depicted in FIG. 2.

FIGS. 2 and 3 depict further details of the holder 80 and the optical fiber cleaving A mechanism 200 disposed therewithin, wherein FIG. 2 is a top plan view and FIG. 3 is a front elevational view of the holder 80. As depicted therein, the cleaver slide 202 is slidably engaged to the holder 80 utilizing two screws 204 that are threadably engaged in threaded bores 212 formed downwardly into the holder 80. The screws 204 have enlarged heads 216 which slidably engage narrowed shoulders 220 formed within the engagement slots 208. It is therefore to be understood that the cleaver slide 202 is slidable in a direction 224 that is perpendicular to the bore 96 through the holder 80. A coil spring 230 is engaged between the holder 80 and the cleaver slide 202 to urge the slide 202 towards the nominal position depicted in FIGS. 1, 2 and 3; it being understood that when the cleaver slide 202 is moved in direction 224 during a cleaving operation, as is discussed herebelow, the coil spring 230 will be extended, and it will thereafter act to retract the cleaver slide 202 in direction 296 back to the nominal position depicted in FIGS. 1, 2 and 3. The operational engagement of the coil spring 230 is achieved through the engagement of a first end 234 of the spring 230 with a spring engagement pin 236 that is threadably engaged in a threaded pin bore 238 disposed within the cleaver slide 202. The other end 240 of the spring 230 is engaged to a threaded spring engagement pin 242 that is engaged in a threaded pin engagement bore 244 formed in the holder 80. To facilitate the operational movement of the spring 230 within the holder 80, a spring movement slot 250 is formed downwardly into the holder 80, and the outward end 254 of the slot 250 is extended to provide ample room for the expansion of the coil spring 230 during a sliding movement 224 of the cleaver slide 202 to accomplish an optical fiber cleaving step.

A central portion 260 of the cleaver slide 202 is raised, and a generally rectangular cavity 264 is formed therein. The cavity 264 serves as an enclosure surrounding an upwardly disposed optical fiber cleaving block 270, which is disposed within the cavity 264 when the cleaver slide 202 is in its nominal position as depicted in FIGS. 1, 2 and 3. As is discussed in greater detail herebelow, the cleaver block 270 is pivotally mounted about a pivot pin 274 which projects through a pivot pin bore 276 formed through the holder 80 and through the cleaver block 270, and a cleaver block biasing spring 278 is disposed about the pivot pin 274 to urge the cleaver block 270 upwards into the cavity 264 in the nominal position depicted in FIGS. 1, 2 and 3.

Figure 4:
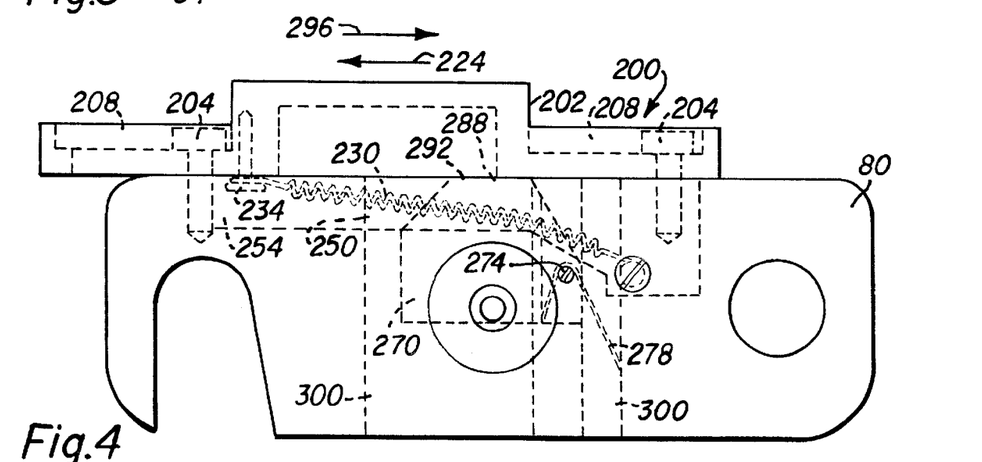
FIG. 4 is a front elevational view of the optical fiber cleaving device as depicted in FIG. 3 wherein the cleaver slide has been moved towards the left, as is accomplished during an optical fiber cleaving operation.

FIG. 4 depicts the optical fiber cleaving position of the present invention; it being understood that FIG. 4 is a front elevational view of the holder 80 taken from the same viewpoint as FIG. 3. As depicted in FIG. 4, the cleaver slide 202 has been moved leftwardly 224, extending the coil spring 230 within the end 254 of the coil spring slot 250. The cleaver block 270 has rotated downwardly about the pivot pin 274, placing increased tension upon the cleaver block biasing spring 278. It is to be appreciated that the mechanical interaction of the lower edge 288 of the wall of the cavity 264 with the upper surface 292 of the cleaver block 270 is the contact point that forces the cleaver block 270 to rotate downwardly. It will be further appreciated that when the cleaver slide 202 is thereafter moved rightwardly 296 that the cleaver block biasing spring 278 will cause the cleaver block 270 to rotate upwardly into the cavity 264 about the pivot pin 274, in a return to the nominal position depicted in FIGS. 1, 2 and 3.

Figure 5:
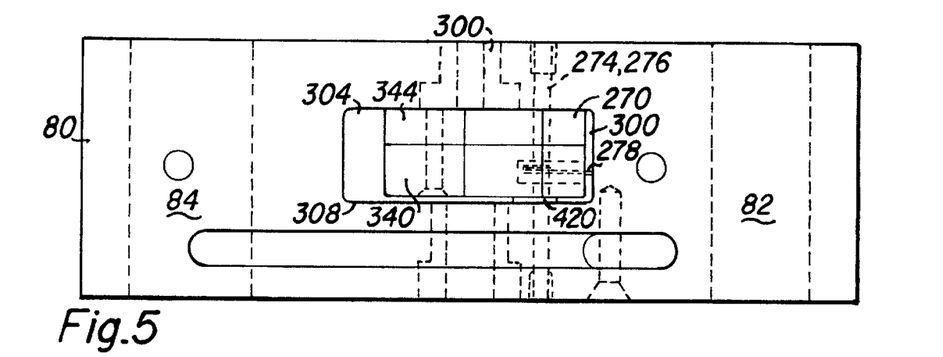
FIG. 5 is a top plan view of the cleaving device as depicted in FIG. 3 having the cleaver slide removed.
Figure 6:
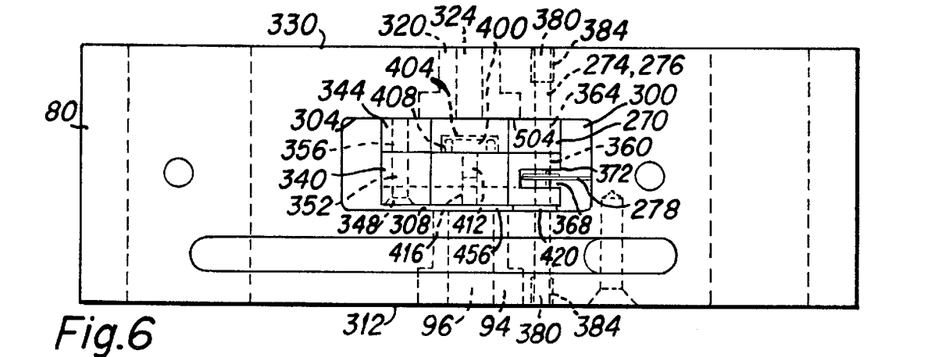
FIG. 6 is a top plan view of the optical fiber cleaving device as depicted in FIG. 4, having the cleaver slide removed.

Further features of the present invention will be understood with the aid of FIGS. 5 and 6, wherein FIG. 5 is a top plan view of the holder 80 having the cleaver slide 200 removed and the cleaver block 270 disposed in the nominal position as depicted in FIG. 3, and FIG. 6 is a top plan view of the holder 80 having the cleaver slide 200 removed, wherein the cleaver block 270 is disposed in the cleaving position as depicted in FIG. 4. It will be noted that the depiction of the cleaver block 270 in FIG. 6 includes certain internal detailed structures that are not contained in the cleaver block depiction of FIG. 5; this is due to the pivotal rotation of the cleaver block 270 in FIG. 5 that adds significant complexity to the depiction of the internal components of the cleaver block therewithin. A complete understanding of the cleaver block components is provided hereinafter. As depicted in FIGS. 5 and 6, a generally rectangular cleaver block bore 300 is formed downwardly through the holder 80 from its upper surface to its lower surface, and the cleaver block 270 is rotatably disposed within the bore 300 about the pivot pin 274. The bore 300 is formed with a planar fiberoptic connector side surface 304 and a planar impact mount side surface 308. The impact bushing 94 and the impact tool bore 96 are disposed between the front surface 312 of the holder 80 and the impact mount surface 308 of the bore 300. A cylindrical optical fiber connector bushing 320 having a fiberoptic connector bore 324 formed therethrough is disposed within the holder 80 between the rear surface 330 of the holder 80 and the fiberoptic connector surface 304 of the bore 300. The fiberoptic connector bore 324 is axially aligned with the impact tool bore 96, such that the frontward tip of a fiberoptic connector that is inserted through the fiberoptic connector bore 324 into the holder 80 will be disposed in alignment with the impact tip of the punch 50 which projects through the impact tool bore 96, whereby the impact mounting of an optical fiber within the fiberoptic connector tip can be achieved within the holder 80.

The cleaver block 270 includes a deflecting plate 340 and a blade plate 344 that are engaged together utilizing a threaded cleaver block engagement bolt 348 that passes through a smooth cleaver block engagement bore 352 formed through the deflection plate 340 and is threadably engaged in a threaded bore 356 formed through the blade plate 344. The pivot pin 274 passes through a smooth pivot pin bore 360 formed through the deflection plate 340 and through a smooth pivot pin bore 364 formed through the blade plate 344. A spring slot 368 is cut into a side 372 of the deflection plate 340, such that the biasing spring 278 is mountable around the pivot pin 274 which passes through the spring slot 368. In a preferred assembly configuration for the pivot pin 274, short threaded screws 380 are threadably engaged in threaded end portions 384 of the pivot pin bore 276 that is formed through the holder 80. The end screws 380 serve to removably hold the pivot pin 274 within the pivot pin bore 276. As is described in further detail herebelow, an optical fiber cleaving blade 400 is mounted within a blade slot 404 formed in the blade plate 344. A blade spring 408 is disposed within the blade slot 404 to urge the blade 400 downwardly, and a threaded blade stop member 412 is disposed within a threaded bore 416 formed within the deflection plate 340 to act as a stop on the downward movement of the blade 400 within the blade slot 404. A flat spring 420 is disposed within the cleaver block bore 300 between the impact mount side surface 308 and the front surface 456 of the deflection plate 340, to urge the cleaver block 270 rearwardly, such that the rearward surface 504 of the blade plate 344 makes slidable contact with the fiberoptic connector side surface 304 of the bore 300. Further features and details of the cleaver block and its components are next discussed with the aid of FIGS. 7–14.

Figure 7:
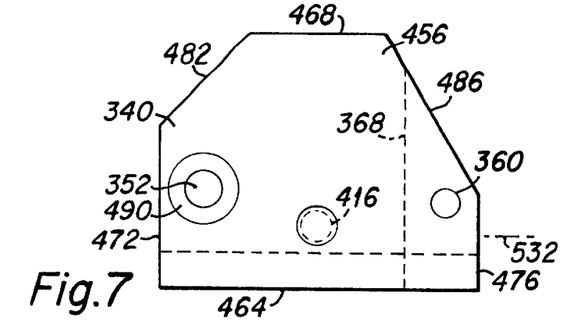
FIG. 7 is a front elevational view of the deflection plate portion of the optical fiber cleaving block.
Figure 8:
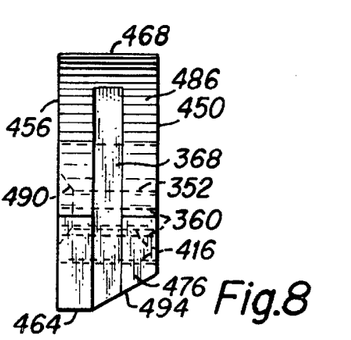
FIG. 8 is a side elevational view of the deflection plate depicted in FIG. 7.

A detailed depiction of the deflection plate 340 is presented in FIGS. 7 and 8, wherein FIG. 7 is a front elevational view and FIG. 8 is a side elevational view. As depicted therein, the deflection plate 340 is formed with a flat front surface 456, a flat rearward surface 460, a lower edge 464, an upper edge 468 that is generally parallel to the lower edge 464, a left side edge 472 which forms a generally right angle with the lower edge 464, a right side edge 476 which forms a generally right angle with the lower edge 464, an angled upper left hand edge 482 which forms a generally 45° angle with the top edge 468, and an angled upper right side edge 486 which forms a generally 60° angle with the upper edge 468. The spring slot 368 is formed in the right side edge through both the lower right side edge 476 and the upper right side edge 486, and the pivot pin bore 360 is formed proximate the right side edge such that it passes through the slot 368. The cleaver block engagement bore 352 is formed proximate the left side edge of the deflection plate 340, and an outer portion 490 of the bore 352 may be enlarged to receive an enlarged head portion of the cleaver block engagement bolt 348. The threaded bore 416 of the cleaving blade stop screw 412 is generally centrally disposed through the front face 456 to the rearward face 460 of the deflection plate 340. As is best seen in FIG. 8, the inward portion 494 of the lower edge 464 of the deflection plate 340 is cut away at an angle of approximately 30° relative to the lower edge 464 to form an optical fiber deflection surface 494. The function of the deflection surface 494 will become understood upon further consideration of this disclosure.

Figure 9:
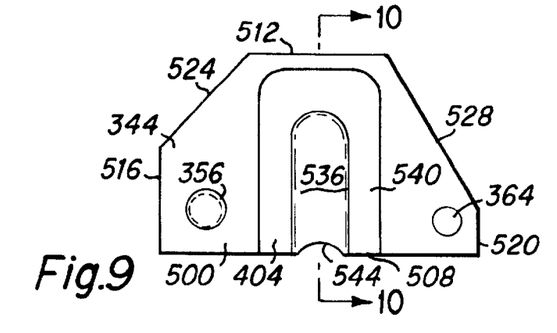
FIG. 9 is a front elevational view of the blade plate of the optical fiber cleaving block.
Figure 10:
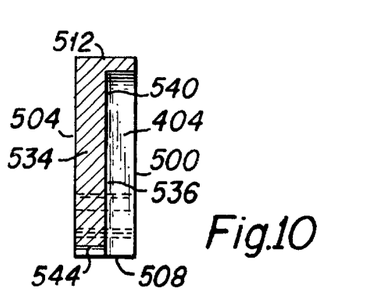
FIG. 10 is a side cross-sectional view of the blade plate depicted in FIG. 9, taken along lines 10—10 of FIG. 9.

FIGS. 9 and 10 depict detailed features of the blade plate 344, wherein FIG. 9 is a front elevational view and FIG. 10 is a cross-sectional view taken along lines 10—10 of FIG. 9. As depicted in FIGS. 9 and 10, the blade plate 344 includes a front surface 500, a rear surface 504, a lower edge 508, an upper edge 512, a lower left side edge 516 that makes a generally 90° angle with the lower edge 508, a right lower side edge 520 that makes a generally 90° angle with the lower edge 508, an upper left side edge 524 that makes a generally 45° angle with the upper edge 512, and an upper right side edge 528 that makes a generally 60° angle with the upper edge 512. The blade plate pivot pin bore 364 is formed through the blade plate proximate the right side edge 520 and the threaded cleaver block engagement bore 356 is formed through the blade plate generally proximate the left side edge 516. Upon consideration of the deflection plate depicted in FIG. 7 and the blade plate depicted in FIG. 9, it is to be understood that the top edges and upper left and right side edges of the deflection plate and blade plate are similarly sized and shaped such that a generally smooth, continuous edge surface is formed between the deflection plate and blade plate when they are mounted upon the pivot pin and when the cleaver block engagement bolt 348 is passed through the deflection plate bore 352 and threadably engaged in the blade plate bore 356. It is to be further noted that the lower left and right side edges 516 and 520 respectively of the blade plate are shorter than the lower left side edge and right side edge 472 and 476 respectively of the deflection plate 340. Thus, when the deflection plate and blade plate are joined together, lower portions of the deflection plate 340 will project downwardly further than the lower edge 508 of the blade plate, and a line 532 is provided in FIG. 7 to indicate the position of the bottom edge 508 of the blade plate relative to the deflection plate when the blade plate and deflection plate are joined together. For farther understanding, FIG. 12 provides a cross-sectional view of the engagement of the deflection plate and blade plate, as is discussed in detail herebelow.

With further reference to FIGS. 9 and 10, a generally rectangular cleaving blade slot 404 is cut into the front surface 500 of the blade plate 344 from the lower edge 508 upwardly, such that a reduced thickness rearward portion 534 of the blade plate remains. The blade slot 404 is formed to slidably receive an optical fiber cleaving blade 400, as is described herebelow. To further facilitate the slidable engagement of the blade 400 within the slot 404, a shallow recess 536 is formed in the rearward surface 540 of the slot 404 to provide a smooth frictional engagement of the blade 400 within the slot 404. An arcuate slot 544 is cut in the lower edge 508 of the blade plate 344, from the rearward surface 540 of the blade slot 404 to the rearward surface 504 of the blade plate to prevent contact and interference of the lower edge 508 of the blade plate with the surface of a fiberoptic connector during a cleaving operation, as is described in further detail herebelow.

Figure 11:
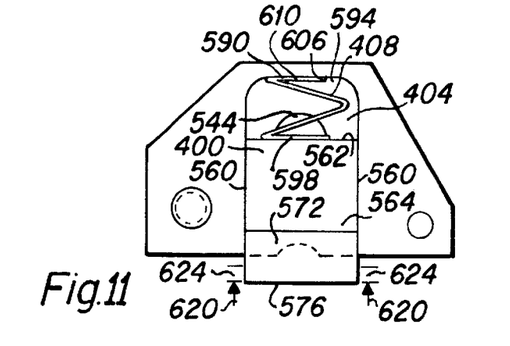
FIG. 11 is a front elevational view of the blade plate depicted in FIGS. 9 and 10 having an optical fiber cleaving blade and blade spring disposed therein.
Figure 12:
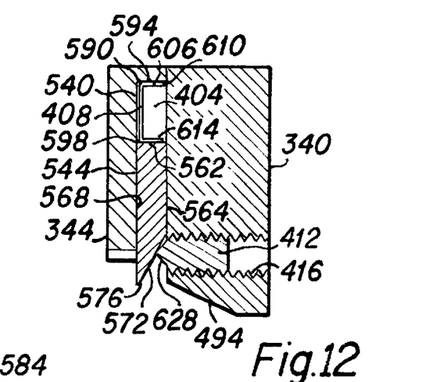
FIG. 12 is a side cross-sectional view of the cleaving blade disposed within the cleaving block.
Figure 13:
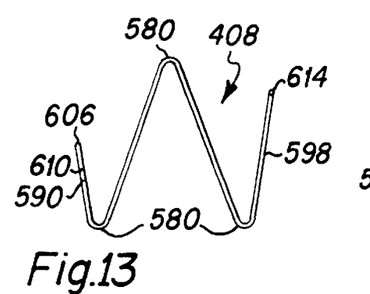
FIG. 13 is a plan view of the cleaver blade spring depicted in FIG. 11.
Figure 14:
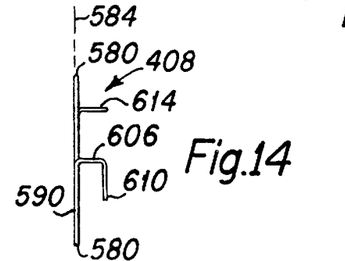
FIG. 14 is a side elevational view of the cleaver blade spring depicted in FIG. 13.

As is best seen in FIG. 11 and FIG. 12, the optical fiber cleaving blade 400 has flat, parallel sides 560, a flat top surface 562, a flat front surface 564, a flat rearward surface 568 which slidably engages the rearward surface 540 of the blade slot 404. The lower portion 572 of the cleaver blade front surface 564 is cut away at an angle to produce a sharp optical fiber cleaving edge 576 along the rearward surface 544 of the blade 400. The blade spring 408 is disposed within the slot 404 to urge the blade 400 downwardly, and FIGS. 13 and 14 provide a front and side elevational view of the preferred shape of the blade spring 408. As depicted therein, the blade spring 408 includes three acute angle bends 580 which generally lie in a plane 584. In the preferred embodiment the blade spring 408 is configured from a length of 0.005 inch diameter piano wire, although other materials having comparable resilient properties may be utilized.

As depicted in FIGS. 11, 12, 13 and 14, an upper portion 590 of the blade spring 408 is operatively disposed against the top edge 594 of the blade slot 404, and a lower portion 598 of the spring 408 is operatively disposed against the upper surface 562 of the blade 400. To facilitate and maintain the operative orientation of the spring 408 within the slot 404, an upper end portion 606 of the spring 408 is bent outwardly and orthogonally to the generalized plane 584 of the spring 408 and an end portion 610 of the outwardly disposed end section 606 is further bent normally to the projecting portion 606. Additionally, the end portion 614 of the lower end 598 is also bent orthogonally to the plane 584 of the spring 406. As will be appreciated from FIG. 12 the orthogonally projecting portions 606 and 614 serve to retain the spring 408 in proper orientation within the slot 404. It is therefore to be understood that the spring 408 is disposed to resist the upward motion 624 of the blade 400 when the blade 400 contacts an optical fiber for cleaving. The typical upward motion 624 of the blade 400 is shown by arrows 620 in FIG. 11, which upward motion 624 occurs when the blade edge 576 strikes the optical fiber.

As briefly discussed hereabove, and shown in detail in FIG. 12, the downward projection of the cleaving blade 400 is adjustably determined utilizing the threaded blade stop member 412 that is disposed within the threaded bore 416. Specifically, the threaded blade stop member 412 is formed with a projecting conical tip 628 which makes contact with the blade edge surface 572. It is to be understood that the adjustable protrusion of the blade stop member 412 acts to adjust the point at which the tip 628 contacts the surface 572, whereby the downward protrusion of the cleaving blade 400 is made adjustable. Having described the various components of the present invention, the operational characteristics and method of operation of the present invention is next discussed with the aid of FIGS. 15 and 16, wherein FIG. 15 is a side cross-sectional view depicting the impact mounting of an optical fiber within the tip of a fiberoptic connector, and FIG. 16 depicts the cleaving of the optical fiber following impact mounting.

Figure 15:
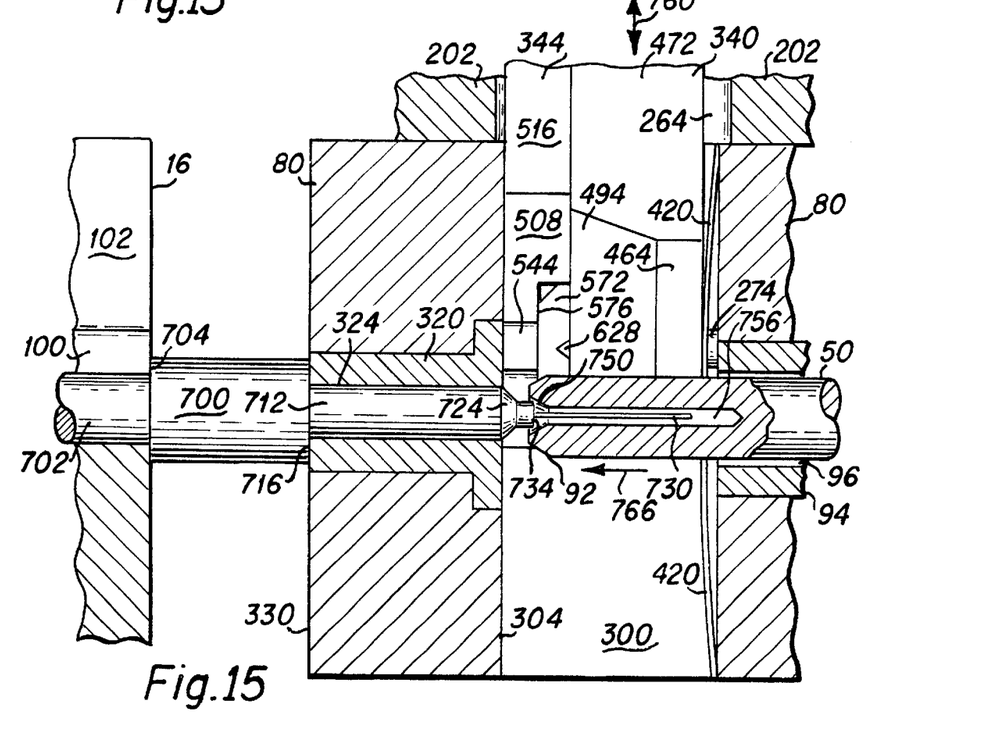
FIG. 15 is a side cross-sectional view depicting the impact mounting of an optical fiber within the tip of a fiberoptic connector utilizing the device 10 depicted in FIG. 1.

As depicted in FIG. 15, a fiberoptic connector 700 is disposed within the impact mount and cleaving device 10, such that a rearward portion 702 of the body of the connector 700 rests within the narrow connector mounting slot 100 of the sidewall 16 of the impact mounting device, and a rearward shoulder portion 704 of the connector 700 rests against the inner surface of the sidewall 16. A generally cylindrical nose portion 712 of the connector body 700 projects through the fiberoptic connector bore 324 of the holder 80 such that a forward shoulder portion 716 of the connector 700 rests against the optical fiber connector bushing 320. The nose portion 724 of the connector 700 projects outwardly from the inner surface of the optical fiber connector bushing 320 and the fiberoptic connector surface 304 of the generally rectangular cleaver block bore 300. An extending portion of an optical fiber 730 projects outwardly from the nose portion 734 of the fiberoptic connector 700. The nose portion 92 of the impact driver 50 projects through the impact tool bore 96 formed through the impact tool bushing 94. The impact nose 92 includes an inwardly projecting cone shaped impact mounting surface 750 having an inwardly projecting optical fiber projection bore 756 disposed therewithin. The extending optical fiber 730 projects into the bore 756 during the impact mounting process.

It is to be understood that during the impact mounting process depicted in FIG. 15 that the cleaver block 270 is in its upwardly rotated position as depicted in FIG. 3; that is, it is rotated upwardly and out of the way such that the nose 92 of the impact driver 50 can contact the impact nose 734 of the fiberoptic connector 700. Thus, as depicted in FIG. 15, the cleaver block 270 is rotated upwardly (see arrow 760), whereby the cleaver blade edge 576, the deflection surface 494 and other components of the cleaver block 270 are visible. It is noted that the flat spring 420 is disposed to urge the cleaver block 270 rearwardly against the fiberoptic connector side surface 304 of the bore 300. It is also understood that upon actuation of the impact driver 50 towards (see arrow 766) the impact nose 734 of the fiberoptic connector that the outer edge of the nose 734 will become mechanically deformed to frictionally engage the optical fiber 730 within the nose 734 of the fiberoptic connector 700 (as is depicted in FIG. 16). The interaction of the shoulder 704 of the fiberoptic connector 700 with the sidewall 16 prevents the fiberoptic connector from moving rearwardly when the nose 92 of the impact driver 50 makes the impacting contact with the nose 734 of the fiberoptic connector 700. After the impact driver 50 has been actuated to impact mount the optical fiber 730 within the nose 734 of the fiberoptic connector 700, the impact driver 50 is removed from its projection through the bore 96 of the holder 80. Immediately thereafter, while the fiberoptic connector 700 is disposed within the fiberoptic connector bore 324, the cleaver slide 202 is moved in direction 224, as depicted in FIG. 4, to cause the cleaver block 270 to rotate downwardly about the pivot pin 274, as has been described in detail hereabove, and is shown in FIG. 16.

Figure 16:
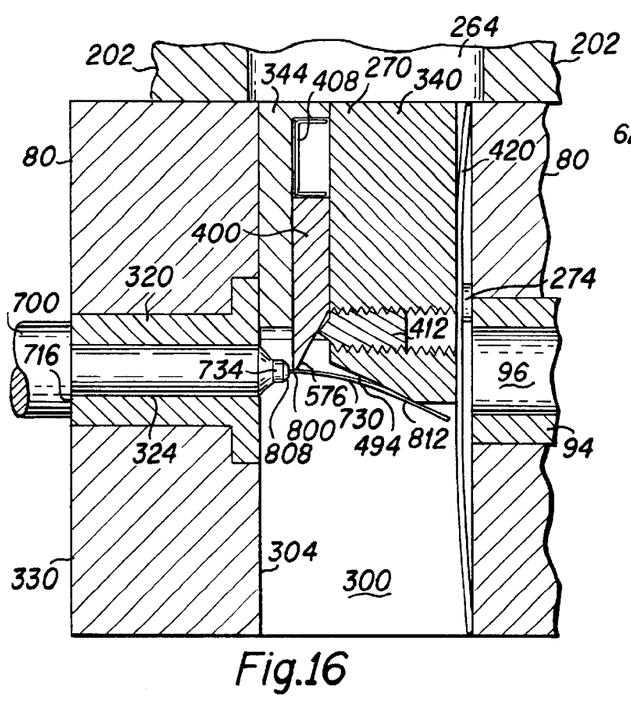
FIG. 16 is a side cross-sectional view of the optical fiber cleaving head disposed in position for cleaving an optical fiber.
Figure 17:
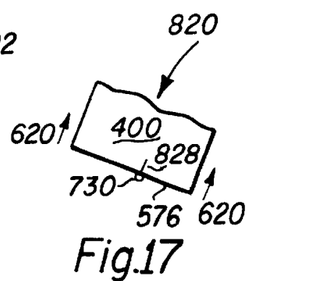
FIG. 17 is a front elevational view depicting the cleaving of an optical fiber by the cleaving blade.
Figure 18:
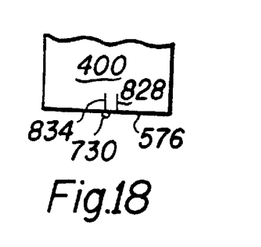
FIG. 18 is a front elevational view further depicting the cleaving of an optical fiber by the cleaving blade of the present invention.

As depicted in FIG. 16 the movement 224 of the slide 202 causes the cleaver block 270 to rotate downwardly, such that the cleaving edge 576 of the cleaving blade 400 makes contact with the projecting portion of the optical fiber 730 at a point 800 proximate the impact deformed 808 nose 734 of the fiberoptic connector 700. Additionally, the deflection surface 494 of the deflection plate 340 has made contact with the outwardly projecting portion 812 of the projecting optical fiber 730 and has bent the projecting optical fiber 730 downwardly. FIGS. 17 and 18 depict the cleaving contact of the cleaving blade 400 with the optical fiber 730. As depicted in FIG. 17, as the cleaving block rotates downwardly about the pivot pin 274, the cleaving blade 400 likewise rotates downwardly (see arrow 820) until the edge 576 of the blade 400 makes contact at point 828 of the blade edge 576 with the outer surface of the optical fiber 730. Thereafter, as the cleaving block rotates further towards its full downward position, the blade 400 moves upwardly (see arrows 620) against spring 408 as has been discussed hereabove. When the cleaving block 270 and the cleaving blade 400 are in the full downward position, as depicted in FIG. 18, the contact point of the blade cutting edge 576 will have moved to a new contact point 834. It is therefore to be understood that during this blade-optical fiber contact process that the blade will have scored the outer surface of the optical fiber 730 through the lateral blade movement from the initial contact point 828 to the final contact point 834. This scoring of the optical fiber is helpful in the cleaving of the optical fiber at point 800. The deflection of the optical fiber as depicted in FIG. 16, caused by the contact of the deflection surface 494 with the end 812 of the optical fiber then causes the cleaving of the optical fiber at the scoring point 800. Thus, the configuration of the device depicted in FIG. 16 shows the moment of optical fiber cleavage where the optical fiber has been scored at point 800 and the end 812 of the optical fiber is fully downwardly deflected.

A significant feature of the present invention is the close dimensional tolerances of the length of the bushing 320, the thickness of the rearward portion 534 of the deflection plate 344 and the length of the projecting portion 712 of the fiberoptic connector 700 from the shoulder 716 to the impact mount nose 734. As will be understood by those skilled in the art, these dimensions must be selected and maintained, as depicted in FIG. 16 such that the edge 576 of the cleaver blade 400 makes a contact point 800 with the optical fiber 730 immediately outside of the impact nose 808 of the fiberoptic connector 700. In the preferred embodiment, the distance from the impact nose 808 to the optical fiber cleaving point 800 is approximately 0.005 inches. To maintain this close tolerance it is important that the flat spring 420 urge the cleaver block 270 rearwardly as has been described hereabove.

While the preferred embodiment of the present invention has been shown and described in detail hereabove, it is not intended that the inventive features of the present invention be so narrowly defined. Rather, the following claims are intended to be interpreted to cover not only the embodiment described herein, but also all and various equivalent structures that nevertheless include the true sprit and scope of the present invention.

What is claimed is:

1. An optical fiber cleaving device, comprising:
   an optical fiber holding member;
   an actuating member being disposed in operable engagement to said holding member;
   an optical fiber cleaving member being movably engaged to said holding member and being not fixedly engaged to said actuating member; said cleaving member including an optical fiber cleaving blade being engagable therewith;
   said actuating member being operable to contact said cleaving member to cause relative motion of said cleaving member in relation to said holding member, whereby said cleaving blade is urged to make cleaving contact with an optical fiber disposed within said holding member; and
   wherein said cleaving member makes contact with said optical fiber to bend said optical fiber prior to a contact of said cleaving blade with said optical fiber.

2. An optical fiber cleaving device as described in claim 1 wherein said cleaving member is pivotally engaged to said holding member.

3. An optical fiber cleaving device as described in claim 1 wherein said cleaving blade is movably engaged with said cleaving member.

4. An optical fiber cleaving device as described in claim 3 wherein said cleaving blade is slidably engaged within a blade slot formed within said cleaving member.

5. An optical fiber cleaving device as described in claim 4 wherein a blade biasing spring is disposed within said blade slot.

6. An optical fiber cleaving device as described in claim 1 wherein said cleaving contact of said cleaving blade with said optical fiber is a fiber scoring contact.

7. An optical fiber cleaving device, comprising:
   an optical fiber holding member having a bore formed therethrough for holding an optical fiber therewithin;
   an optical fiber cleaving member being pivotally engaged with said holding member; said cleaving member including a cleaving blade slot formed therewithin;
   an optical fiber cleaving blade being movably engaged within said cleaving blade slot;
   an actuating member being slidably engaged to said holding member and disposed to make contact with said cleaving member when said actuating member is slidably moved in association with said holding member;
   said cleaving member being pivotally rotated upon said contact with said actuating member, whereby said cleaving blade is caused to make cleaving contact with said optical fiber.

8. An optical fiber cleaving device as described in claim 7 wherein portions of said cleaving member are disposed to make contact with said optical fiber to bend said optical fiber prior to said cleaving contact of said cleaving blade with said optical fiber.

9. An optical fiber cleaving device as described in claim 8 wherein said cleaving blade is slidably engaged within said blade slot, such that said cleaving blade is movable within said slot upon making cleaving contact with said optical fiber, whereby an optical fiber scoring contact is made between said cleaving blade and said optical fiber.

10. An optical fiber mounting and cleaving device, comprising:
    an optical fiber holding member having a bore formed therethrough for holding an optical fiber connector therewithin;
    an optical fiber mounting member being disposed proximate said optical fiber holding member and being actuatable to mount an optical fiber to said fiberoptic connector;
    an optical fiber cleaving member being movably engaged to said holding member; said cleaving member including an optical fiber cleaving blade being engaged therewith;
    an actuating member being disposed in operable engagement to said holding member and said cleaving member, and being operable to cause relative motion of said cleaving member in relation to said holding member, whereby said cleaving blade is urged to make cleaving contact with an optical fiber disposed within said holding member.

11. An optical fiber cleaving device as described in claim 10 wherein said cleaving member is pivotally engaged to said holding member.

12. An optical fiber cleaving device as described in claim 10 wherein said actuating member is slidably engaged to said holding member.

13. An optical fiber cleaving device as described in claim 10 wherein said actuating member is slidably engaged to said holding member, and said cleaving member is pivotally engaged to said holding member, such that slidable motion of said actuating member causes contact with and pivotal motion of said cleaving member.

14. An optical fiber cleaving device as described in claim 10 wherein said cleaving blade is movably engaged with said cleaving member.

15. An optical fiber cleaving device as described in claim 14 wherein said cleaving blade is slidably engaged within a blade slot formed within said cleaving member.

16. An optical fiber cleaving device as described in claim 15 wherein a blade biasing spring is disposed within said blade slot.

17. An optical fiber cleaving device as described in claim 10 wherein said cleaving member makes contact with said optical fiber to bend said optical fiber prior to a contact of said cleaving blade with said optical fiber.

18. An optical fiber cleaving device as described in claim 10 wherein said cleaving contact of said cleaving blade with said optical fiber is a fiber scoring contact.

19. An optical fiber cleaving device, comprising:
   an optical fiber holding member;
   an actuating member being disposed in operable engagement to said holding member;
   an optical fiber cleaving member being movably engaged to said holding member and being not fixedly engaged to said actuating member; said cleaving member including an optical fiber cleaving blade being engagable therewith;
   said actuating member being operable to contract said cleaving member to cause relative motion of said cleaving member in relation to said holding member, whereby said cleaving blade is urged to make cleaving contact with an optical fiber disposed within said holding member; and
   wherein said actuating member is slidably engaged to said holding member.

20. An optical fiber cleaving device as described in claim 19 wherein said cleaving member is pivotally engaged to said holding member, such that slidable motion of said actuating member causes contact with and pivotal motion of said cleaving member.

21. An optical fiber mounting and cleaving device, comprising:
   an optical fiber holding member having a bore formed therethrough for holding an optical fiber connector therewithin;
   an optical fiber mounting member being disposed proximate said optical fiber holding member and being actuatable to mount an optical fiber to said fiberoptic connector;
   an optical fiber cleaving member being pivotally engaged within said holding member; said cleaving member including a cleaving blade slot formed therewithin;
   an optical fiber cleaving blade being movably engaged with said cleaving blade slot;
   an actuating member being slidably engaged to said holding member and disposed to make contact with said cleaving member when said actuating member is slidably moved in association with said holding member;
   said cleaving member being pivotally rotated upon said contact with said actuating member, whereby said cleaving blade is caused to make cleaving contact with said optical fiber.

22. An optical fiber cleaving device as described in claim 21 wherein portions of said cleaving member are disposed to make contact with said optical fiber to bend said optical fiber prior to said cleaving contact of said cleaving blade with said optical fiber.

23. An optical fiber cleaving device as described in claim 22 wherein said cleaving blade is slidably engaged within said blade slot, such that said cleaving blade is movable within said slot upon making cleaving contact with said optical fiber, whereby an optical fiber scoring contact is made between said cleaving blade and said optical fiber.

24. An optical fiber mounting and cleaving device as described in claim 21 wherein said optical fiber mounting member is actuatable to cause a mounting impact with a tip of said fiberoptic connector to cause an impact mounting of said optical fiber with said fiberoptic connector.

* * * * *